Feb. 8, 1938.  E. A. KOETHER  2,107,301
PISTON RING
Filed Aug. 1, 1935
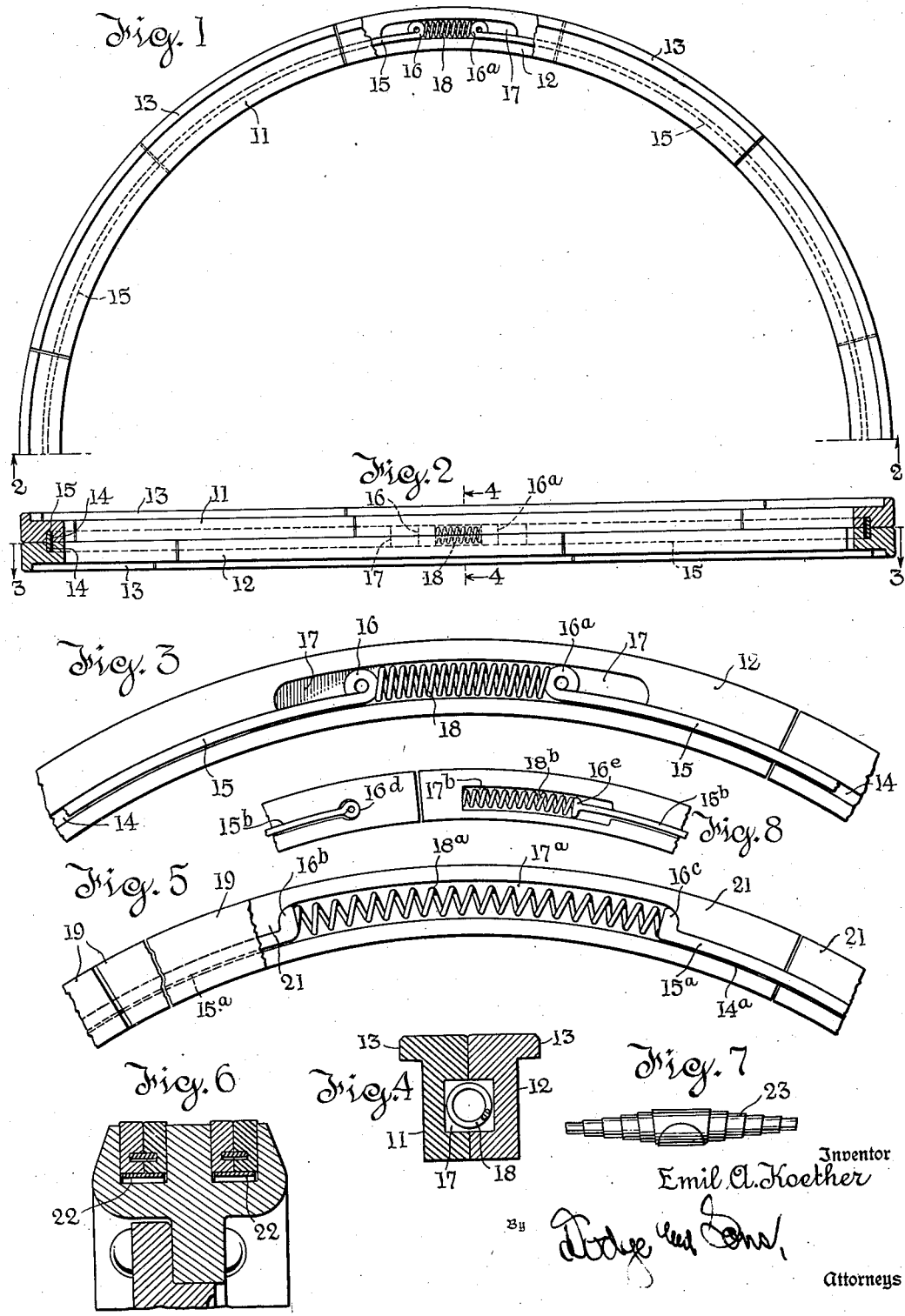
Inventor
Emil A. Koether Patented Feb. 8, 1938

2,107,301

UNITED STATES PATENT OFFICE 2,107,301

PISTON RING

Emil A. Koether, Baltimore, Md., assignor, by mesne assignments, to Koppers Company, a corporation of Delaware Application August 1, 1935, Serial No. 34,277

10 Claims. (Cl. 309—44)

This invention pertains to piston rings, and while the structure is designed more particularly for use in engines employing steam as a motive fluid, it may to advantage be used in engines of the Diesel or other types as well.

The main object of the invention is to produce a ring formed of a plurality of elements extending circumferentially of the piston and lying in facewise relation in the ring groove, and to associate therewith position-retaining means which while allowing the component elements of the ring to move independently of one another to a certain extent, will preclude the elements when worn from rolling out of the ring groove and being blown away, as for instance out of a locomotive stack.

Said retaining means, which in and of itself exerts no expanding action upon the ring structure, has associated therewith expanding means which acts through said retaining means to hold the ring elements outwardly in contact with the cylinder wall, up to a predetermined limit of wear, at which time further outward movement of the parts is arrested, with the partially worn ring structure still maintained in the groove.

Moreover, the construction is such that the parts may be disassembled and by a very simple mechanical operation readjusted and replaced, the ring continuing to be serviceable until it reaches the point of maximum wear, or a point where it can no longer be modified to restore its sealing action.

The invention is susceptible of various embodiments, and in the annexed drawing:—

Figure 1 is a side view of a portion of a ring produced from segments, with parts broken away, showing one embodiment of the invention;

Fig. 2, a transverse sectional view on the line 2—2 of Fig. 1, looking in the direction of the arrow;

Fig. 3, a sectional elevation on an enlarged scale taken on the line 3—3 of Fig. 2, the segment restraining and retaining member and the cooperating spring being shown in full;

Fig. 4, a transverse sectional view on the line 4—4 of Fig. 2;

Fig. 5, a view similar to Fig. 1, illustrating a portion of a ring composed of two unflanged snap ring elements lying in facewise relation, with a slightly modified form of restraining element, together with a spring which coacts directly therewith fully expanded, due to wear of the ring;

Fig. 6, a cross sectional view of a slightly modified form wherein an inner expander ring is shown;

Fig. 7, an elevation of a modified form of a spring which may be employed in conjunction with the restraining element of the ring structure; and Fig. 8, a sectional elevation of a further modification of the invention.

Referring first to the construction shown in Figs. 1 to 4, inclusive, the ring may be said to be formed of two annuli lying in facewise relation, each annulus being produced from a series of segmental or arcuate sections. The segments of one series are denoted by 11 and those of the other by 12; they being alike in form except that the flanged portion 13 thereof extends outwardly to opposite sides of the segments. The segments which produce the annuli are designed to fit within a piston groove and lie in facewise relation. The normally contacting faces of said segments 11 and 12 are provided throughout each series with arcuate grooves 14, the grooves in one series standing opposite to those in the opposite series when the ring elements are assembled. Thus, a continuous channel is formed extending around interiorly of the ring structure and is adapted to receive a restraining-retaining element 15, which is of a size in cross section slightly less than the cross sectional area of the channel formed by the grooves 14.

As will be seen upon reference more particularly to Figs. 1 and 3, the ends of the restraining member 15 stop short of each other and the band is curled back upon itself at such ends, as denoted by the reference numerals 16 and 16ª, respectively. These bent-over ends extend into a pocket or chamber 17 formed in a pair of oppositely disposed segments of the series 11 and 12, the chamber communicating at its opposite ends directly with the channel formed by the grooves 14. In other words, the chamber may be said to be an enlargement of said channel made for the purpose of receiving the headed ends 16 and 16ª of the restraining band or element 15.

Interposed between such ends is a coil spring 18 and the parts of the structure are so proportioned that when the ring is mounted within a piston groove, the spring will be placed under compression, hence it will tend to exert an endwise force upon the restraining band 15 which will have a tendency, therefore, to move the segments outwardly to a slight extent through such action.

When the ring has worn down to such a degree that the spring causes the heads 16 and 16ª to bottom against the end walls of the chamber 17, the segments will, of course, be prevented from moving outwardly toward the cylinder wall to any further extent. The element 15 at such time in effect acts to lock all of the segments together insofar as any outward movement is concerned. One may then remove the ring structure and where the ring elements are not worn to too great an extent, cut away the opposite end walls, or one of them, of the pocket or chamber 17 and reinsert the ring with the same spring, or a different and longer spring, between the heads 16 and 16ª, whereby the restraining band 15 will again be allowed to function in conjunction with the spring to move the ring elements outwardly against the wall of the cylinder.

When the ring has worn down to such an extent that it cannot be again modified, it is to be noted that the band 15 will still retain the ring elements within the ring groove, preventing their being blown away, or out through the stack of a locomotive, as above noted.

It is to be borne in mind that the member 15 is essentially non-resilient. It may be formed from soft annealed steel or other material which has essentially no spring action.

In Fig. 5, a slightly modified form of structure is shown, wherein instead of forming the ring of two series of segmental sections lying in facewise relation, two snap rings 19 and 21 are employed, the joints at the ends of the sections being staggered and preferably spaced apart at 90° or 180° to each other.

Each of said members 19 and 21 is provided with grooves 14ª, the same as the grooves 14, forming an annular channel extending throughout the ring and opening into an enlarged chamber or recess 17ª, similar to the chamber 17 of the structure heretofore described.

The restraining element 15ª in this instance has its ends bent outwardly at substantially right angles, as indicated at 16ᵇ and 16ᶜ, respectively, producing radially disposed faces against which the spring 18ª takes a fair bearing.

In the form illustrated in this figure, the ring elements are not flanged and are shown as being worn down to a considerable extent, so that the spring 18ª has moved the ends of the restraining band or element 15ª away from each other, so that they contact the end walls of the chamber 17ª and arrest further movement of the parts in an outward direction.

It will be noted that the thickness of the ring where it overlies the chamber 17ª is materially thinner than that which overlies the chamber 17 in the structure depicted in Fig. 3. This indicates the wearing down of the ring to a point where it is safest to introduce new ring elements rather than seek to elongate the chamber 17ª to a greater extent than that shown on the drawing. The ends 16ᵇ and 16ᶜ as just noted are shown in contact with the end walls of the chamber 17ª and the same condition would obtain with the upturned ends 16, 16ª if and when the segments of the ring in Figs. 1 to 4, inclusive, are worn down so that the spring can force the ends apart and into contact with the end walls of the chamber.

In Fig. 6, a further modification is shown wherein an inner expander spring 22 is shown as underlying the ring elements. This spring may be of any approved form but preferably will be of the ribbon type where, as in the present case, the ring proper is produced from a plurality of elements, either a plurality of segments or snap rings placed side by side.

Any form of spring may be employed in conjunction with the retaining member 15 or 15ª, and in Fig. 7 a volute ribbon spring 23 is illustrated.

In all forms of the invention illustrated, the restraining band or member 15, 15ª will position the parts of the ring structure with reference to the groove and the surface with which the ring coacts in sealing relation, this both inwardly and outwardly of the groove, and the parts of the ring structure will be held closely to position without undue pressure by the interposition of the spring between the ends of the restraining band, it being understood, as above indicated, that undue movement of the parts is arrested when the ring has become worn down to a predetermined extent.

While the spring 18 is shown in Fig. 3 as centralized in the chamber 17 between the ends 16 and 16ª, either one or the other of said ends might be brought into abutting relation with the end wall of the chamber and the spring exert its pressure on one end only of the retaining member 15.

In fact, one end of the retaining and restraining band or element might be anchored in a separate recess formed in one of the elements and the opposite end projected into a pocket or chamber equivalent to 17 or 17ª, (see Fig. 8), the spring abutting such end and the opposite end wall of the chamber. In this figure, the band denoted by 15ᵇ has one end coiled centrally with the band as at 16ᵈ, while the opposite end of the band is upset as at 16ᵉ and bears directly against the end of a spring 18ᵇ, the opposite end of the spring bearing against the wall of a pocket or recess 17ᵇ in which the spring is mounted and into which the member 15ᵇ projects. It is apparent, of course, that the coiling of the retaining or restraining member or element may be in an upward direction, or in the opposite direction and/or located centrally thereof as shown in Fig. 8.

Although the fluid pressure passing beneath the ring will undoubtedly in certain instances suffice to hold the ring in sealing relation, as will also the expander spring 22 if that be employed, the presence of spring 18 or 18ª between the ends of the restraining band will likewise impart a light pressure to said band which will cause it to exert a slight outward pressure upon the ring elements independently of any other force.

It is, of course, conceivable that the segments of one series or one of the snap rings of the pair going to make up the ring may be produced from bronze and the other from iron. In actual use of rings embodying bronze and iron sections in the relation just mentioned, it has been found that the cylinder wall becomes burnished or "slick" by the bronze element, which, of course, tends to wear away more quickly than the iron and fills up any voids, pits or the like in the face of the cylinder wall.

The non-resilient restraining element permits the bronze to wear away initially more rapidly than will the iron but when a certain point is reached, the restraining element causes the two annuli to bear and wear alike. The iron element is effective in carrying the oil along with it, to ensure proper lubrication. Thus, the iron and bronze both contribute to efficient operation and the combination has been found to materially prolong the life of the ring.

This iron-bronze combination in conjunction with restraining means, broadly considered, is set forth and claimed in Letters Patent No. 2,035,435, granted March 24, 1936, to The Bartlett Hayward Company, as the assignee of Allen W. Morton.

What is claimed is:

1. A piston ring comprising two annuli standing in facewise relation, said annuli being free to move relatively to each other, and said annuli each having a groove in the adjacent faces thereof forming a channel extending through the ring, said channel terminating in an enlarged chamber; a non-resilient restraining element mounted in said channel, said element having its ends extending into said chamber and displaced with reference to the body of the element and also to the channel so as to limit the bodily endwise movement of said element by contact of said displaced ends with the end walls of the chamber; and a spring located in said chamber and interposed between said displaced ends and serving to spread the ends apart.

2. A piston ring comprising two annuli, each composed of segments standing end to end, and said annuli likewise standing in facewise relation and being free to move relatively to each other, there being a channel formed in said annuli concentric with the axis of the ring; a non-resilient restraining element mounted in said channel, said member having a cross section less than the cross sectional area of the channel; and means limiting the expansion of said restraining member beyond a predetermined limit whereby the ring may be mounted in a groove and be precluded from rolling out thereof when so worn that no further expansion of the restraining member is possible.

3. A piston ring as set forth in claim 2, wherein a spring is associated with the non-resilient restraining element to spread the same and to thereby assist in maintaining the elements of the ring in contact with a surface with which they effect a sealing action.

4. A piston ring comprising a body consisting of a plurality of cylinder-contacting elements, said body when the elements are brought into assembled relation having a channel extending therethrough in part at least with a chamber formed in the ring structure into which the channel opens at one end at least; a non-resilient restraining band mounted in said channel, said band having an enlargement on one end at least, said enlargement being positioned within the chamber and normally spaced from the adjacent end wall thereof, the opposite end of the band being held against movement; and a compression spring also located in said chamber and bearing against said enlargement, said spring acting to move the restraining band endwise and to thereby assist in part at least in maintaining the ring in proper sealing relation.

5. A piston ring, comprising two annuli standing in facewise relation, one formed of iron and the other of bronze, said annuli being free to move relatively to each other in a radial direction; and means restraining and limiting the movement of the bronze annulus with reference to the iron annulus, said means comprising a non-resilient element common to both of said annuli, a spring acting directly upon and tending to expand said element, and means associated with said element limiting the total amount of movement of the element and thereby limiting the total expansion of the ring.

6. A piston ring comprising two annuli standing in facewise relation, one formed of iron and the other of bronze, each of said annuli being provided with an arcuate groove in its side face, said grooves mating when the ring is assembled, and said annuli being free to move relatively to each other in a radial direction; and means restraining and limiting the movement of the bronze annulus, said means comprising a non-resilient element extending through the channel formed by the grooves aforesaid, and laterally into the same, a spring tending to expand said element, and means associated with said restraining element and the annuli for arresting or terminating the expansive movement of the annuli when the ring becomes worn.

7. A piston ring comprising two annuli standing in facewise relation, said annuli being free to move relatively to each other, and said annuli each having a groove formed in the adjacent side faces thereof producing a channel co-extensive of the ring; a non-resilient restraining element mounted in said channel, said restraining element having a cross section less than the cross sectional area of the channel aforesaid, whereby the annuli are restrained from undue movement one with reference to the other; spring means directly associated with the restraining element acting to expand the same; and means limiting the action of said last named means.

8. A piston ring comprising two annuli standing in facewise relation, said annuli being free to move relatively to each other, there being a channel formed in said annuli concentric with the axis of the ring; a non-resilient restraining element mounted in said channel, said element having a cross section less than the cross sectional area of the channel; and means limiting the expansion of said restraining member beyond a predetermined limit, whereby the ring may be mounted in a groove and precluded from moving outwardly thereof when so worn that no further expansion of the restraining member is possible.

9. A piston ring comprising two annuli composed of segments standing end to end, the segments in one annulus in part at least being formed of bronze and in the other being at least in part of iron, and said annuli likewise standing in facewise relation and being free to move relatively to each other, there being a channel formed in said annuli concentric with the axis of the ring; a non-resilient restraining element mounted in said channel, said member having a cross section less than the cross sectional area of the channel; and means limiting the expansion of said restraining member beyond a predetermined limit whereby the ring may be mounted in a groove and be precluded from rolling out thereof when so worn that no further expansion of the restraining member is possible.

10. A piston ring comprising two annuli formed in part at least of bronze and in part at least of iron, said annuli standing in facewise relation and being free to move relatively to each other, there being a channel formed in said annuli concentric with the axis of the ring; a non-resilient restraining element mounted in said channel, said element having a cross section less than the cross sectional area of the channel; and means limiting the expansion of said restraining member beyond a predetermined limit, whereby the ring may be mounted in a groove and precluded from moving outwardly thereof when so worn that no further expansion of the restraining member is possible.

EMIL A. KOETHER.